Nov. 2, 1926.
T. MIDGLEY
1,605,453
INCORPORATING CORDS IN RUBBER SHEETS
Filed Nov. 10, 1922   2 Sheets-Sheet 1
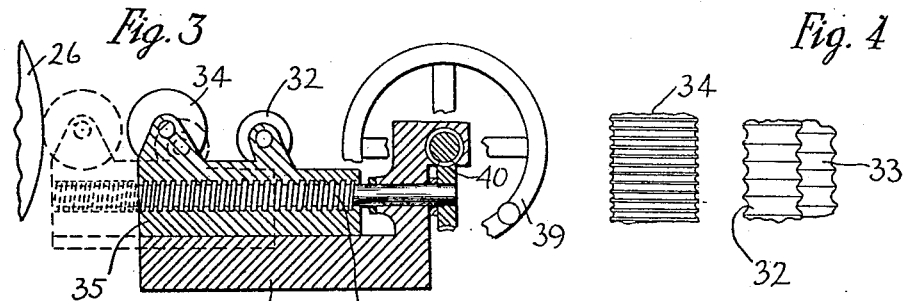
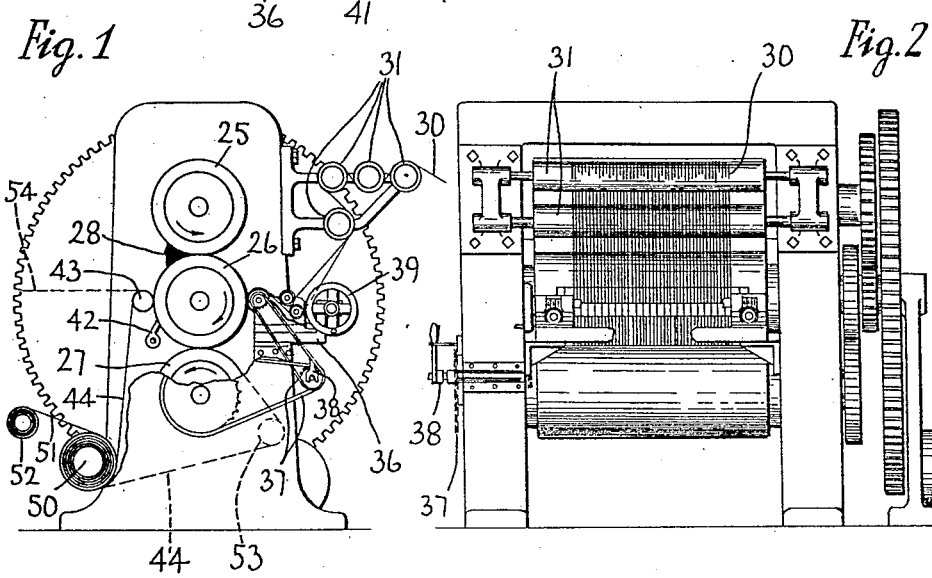
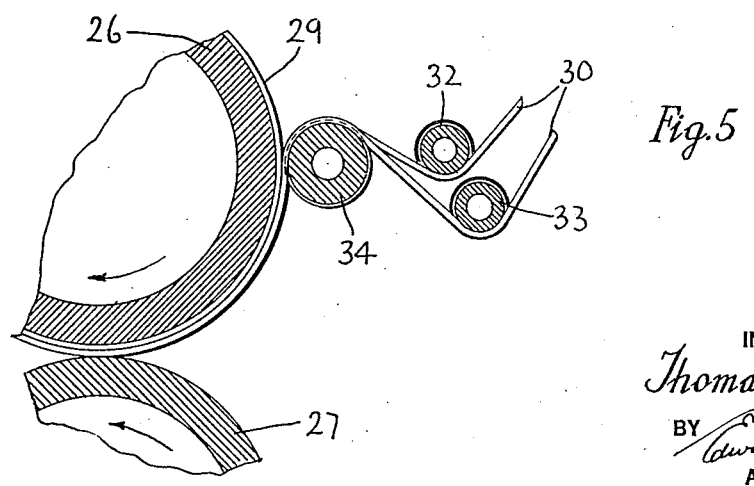
INVENTOR
Thomas Midgley
BY
ATTORNEY Nov. 2, 1926.  
T. MIDGLEY  
1,605,453  
INCORPORATING CORDS IN RUBBER SHEETS  
Filed Nov. 10, 1922   2 Sheets-Sheet 2

INVENTOR
Thomas Midgley
BY Edward C. Taylor
ATTORNEY

Patented Nov. 2, 1926.

1,605,453

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

INCORPORATING CORDS IN RUBBER SHEETS.

Application filed November 10, 1922. Serial No. 599,976.

My present invention relates to the manufacture of cord fabric, in which a plurality of otherwise unconnected parallel cords are embedded in a matrix sheet of rubber.

It has for its object a method of producing weftless cord fabric by which accurate coating of the entire sheet of cords will be obtainable, the coating of both sides of the sheet of cords and the trimming of excess rubber therefrom expedited, and the starting and stopping of the coating operation facilitated. It has other and further objects relating to the improvement of the manufacture of weftless cord fabric which will appear from the following description and claims.

My invention will now be described in connection with the accompanying drawings, in which—

Fig. 1 is a side elevation of a calender, partly broken away, illustrating the invention;

Fig. 2 is a front elevation thereof, partly broken away;

Fig. 3 is an enlarged sectional detail of certain cord guiding devices;

Fig. 4 is a plan of certain cord guiding rolls;

Fig. 5 is an enlarged sectional detail illustrating the manner in which the cords are guided into contact with the rubber sheet;

Figure 6:
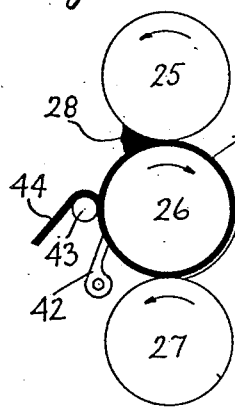
Figs. 6 to 9 are diagrammatic views illustrating the manner of discontinuing the production of cord fabric.

I have illustrated the method as being carried out on a three-roll calender having cord guiding devices similar to those shown on a four-roll calender in my copending application, Serial No. 481,549, filed June 30, 1921. The present method in one of its aspects is designed to carry out the coating of both sides of a sheet of parallel cords upon a three-roll calender, and to that end any suitable cord guiding devices may be employed which will locate the cords in proper relation upon the first rubber sheet. The devices shown in such copending application are, however, preferred, and will be described.

The calender is composed of three rolls, 25, 26, and 27, between the upper two of which is placed a feed of rubber 28. The action of the rolls forms this rubber into a sheet 29, which passes around the middle roll 26. To this middle roll is supplied a series of cords in any desired manner, conveniently substantially that illustrated in the copending case referred to. Briefly stated, this means comprises a creel or other source of supply (not shown) for individual cords 30, from which the cords pass over heating rolls 31 maintained at a temperature hot enough to cause the cords to adhere better to the later-applied rubber. After leaving the last heating roll the cords divide into two groups, passing over grooved rolls 32 and 33 respectively. These rolls, together with a pressure roll 34 having double the number of grooves, and on which the two groups of cords again unite, are mounted on a carriage 35 sliding in ways 36 suitably mounted on the frame of the calender. In Fig. 3 the rolls are shown in full lines in a retracted or inoperative position, and in dotted lines (also in Fig. 5) in the advanced position in which they press the cords against the rubber sheet 29 on calender roll 26. Roll 34 is preferably driven by a suitable chain drive 37 from the lower calender roll through a clutch connection 38, as fully described in said copending application, at a surface speed equal to or slightly less than roll 26, so that the cords are directed to the rubber sheet smoothly and, in the latter case, under a slight ironing or tensioning action due to the difference in speeds. Control of the position of the rolls 32, 33, and 34, is had through a handwheel 39, the shaft of which (Fig. 3) connects, by worm gearing 40, with a screw 41 fixed in the ways 36 and threaded into carriage 35.

Figure 13:
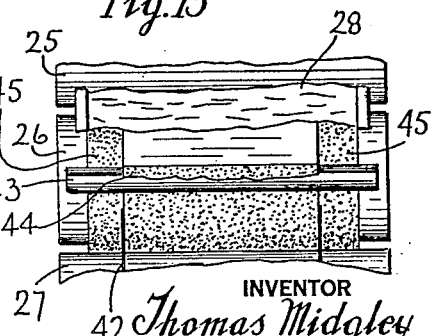
Fig. 13 is a front elevation corresponding to a portion of Fig. 6.

The preferred manner of delivering the composite sheet from the calender and trimming its edge portions embraces knives 42 mounted on suitable supports adjacent roll 26 in a manner known in the art of operating calenders (see, for example, the patent to Lewis 1,151,527, August 24, 1915), and set so as to cut the rubber at each side of the series of cords. Beyond the knives is an idler roller 43 preferably smaller than the roll 26, and over which the trimmed composite sheet of cord fabric 44 passes, the marginal portions 45 (Fig. 13) of rubber passing on roll 25 back into feed 28. This directing of the sheet and the marginal portions along abruptly diverging paths insures accurate trimming and reduces to a minimum both the stretching of the rubber with which the cords are coated, and the consequent curling of the edges of the fabric.

The operation of the devices described above will now be considered, both while the calender is running in normal operation and in connection with certain procedures in stopping and starting the cord coating or impregnating, which form other features of my invention and have particular utility in connection with the devices described. Fig. 6 shows the parts in position for producing weftless cord fabric. The various elements are positioned and operated as described in connection with Fig. 1. No additional comments need be made at this time except to note that roll 34 is preferably mounted close enough to the rubber sheet 29 to actually press the cords into place, or at least to present a very small free space for the cords to travel between the surface of the roll and the rubber sheet. The desired control of the roll position may be had by turning handwheel 39.

Uncured rubber cannot be left on a calender when the latter is inactive without deterioration, and for this reason it is desirable to provide some manner in which the calender may be stopped and the rubber and cords removed therefrom when the amount of cord fabric desired has been produced, and yet without so displacing the cords that the resumption of cord fabric production will require an arduous stringing up operation. Furthermore, it is desirable to provide a guiding apparatus which will permit of the operation of the calender for other purposes during periods of intermission between runs of cord fabric. The manner in which my invention accomplishes these results will now be described.

Figure 7:
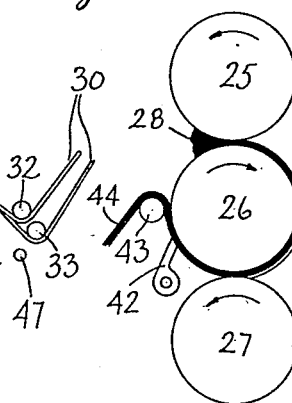
Figure 8:
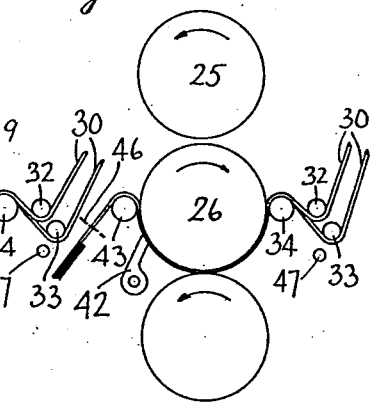
Figure 9:
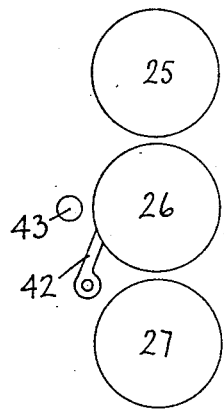

Figs. 7, 8, and 9 show successive stages in the suspension of the production of cord fabric, and the handling of the cords to preserve them in proper relation while the calender is being maintained temporarily inactive for this purpose. The first operation is to remove the feed of rubber 28, and the marginal portions 45 (Fig. 13) of the sheet of rubber trimmed off by knives 42 and lying between roll 43 and the feed 28, leaving the calender in the condition shown in Fig. 7. The calender rolls are then turned sufficiently to carry the end of the rubber sheet 29 through the bight of the two lower calender rolls, as shown in Fig. 8. It may be found necessary to close these two rolls together, as shown in Fig. 8, in order to maintain a sufficient pull on the cords to carry them along after the end of the rubber has passed by the line of contact of the rolls. This can be done by a simple and usual calender adjustment. Also the roll 34 is moved by turning handwheel 39 into a position where it presses the cords tightly against the middle calender roll 26 and holds them against displacement during the next operation. The cords may now be severed along a line indicated at 46 in Fig. 8, the clutch 38 shifted to disconnect the drive of roll 34, the lower calender roll lowered away from the cords as shown in Fig. 9, and the cords pulled back and tied tightly around a rod 47 running transversely of the machine. The shaft serving as part of the adjusting means for the roll 34 might be utilized for this purpose. If the cords are relatively few in number, forming a narrow sheet, they can be tied in one group. If, however, the width of the cord sheet is comparatively great, the cords may be tied in several groups. In either instance the cords are maintained in tight condition. The roll 34 may now be safely backed away from the middle calender roll, as the cords are anchored by tying without danger of displacement. This last step, representing the calender inactive as to the making of cord fabric, is indicated in Fig. 9. With the cords so held, the calender can be operated for any other desired purpose, as the coating of the composite sheet on its second side as will be described, the coating of ordinary fabric, or the production of sheet rubber, without interference from the cords or the cord guiding devices. It may be remarked that the tension under which the cords normally operate during the production of cord fabric will serve to take up the slack that would apparently result from the backing of roll 34 away from the calender. The stretch given to the cords in normal operation is considerable, and the elasticity of the cords prevents any slack forming between roll 34 and rolls 31.

Figure 10:
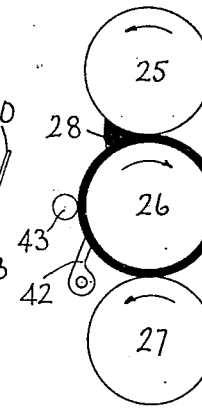
Figs. 10 to 12 are similar views illustrating the starting of the operation of producing cord fabric.
Figure 11:
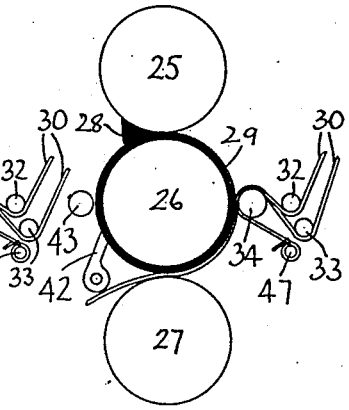
Figure 12:
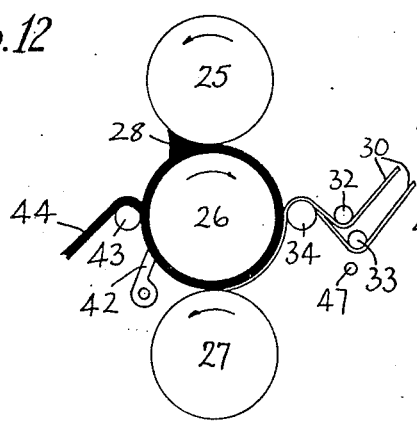

In preparing the apparatus for the production of cord fabric, a feed of rubber is first placed between the upper two calender rolls, and the calender operated and its controls varied to secure the proper roll temperature and settings to have the rubber sheet of the desired condition and thickness. During this preliminary stage the cord guiding devices are kept spaced from the calender roll, and the cords tied around shaft 47 (Fig. 10). The calender is then stopped and roll 34 moved up into pressing contact with the sheet of rubber, thereby gripping the series of cords firmly so that they may be untied from rod 47 without losing their tautness or spacing between roll 34 and the cord supply. The cords are now untied, one group at a time if they have been tied in groups because of the width of the cord sheet, the bottom calender roll slightly lowered, and the cords tucked through the space between the bottom roll and the rubber sheet. If desired, instead of lowering the bottom roll, the cords may be jammed into the bight of the two lower rolls and the calender rotated to pull them through. The first method, however, gives a better control of the cords and is generally preferable. In Fig. 11 some of the cord groups have been shown as still tied to rod 47 and others as inserted through the calender rolls. When all the cords have been tucked through, they may be drawn tight and the bottom roll raised to give the pressure desired in pressing the cords into the rubber sheet. Clutch 38 is then shifted to couple the roll 34 to its driving devices. The calender is then run until the cords have traveled around roll 26 to a point just beyond roll 43, the rubber cut, and the composite sheet led around roll 43. Due to the tight grip maintained on the cords, first by the tying when the roll 34 is not in clamping position, and later by the positive clamping action of roll 34, the cords above the contact line of roll 34 and the rubber sheet will be kept in their proper spaced relation. This limits the scrap at stopping and starting to the length of cord originally tied up, a point of great importance in efficient calender operation. After the sheet has been trimmed, the calender is ready for another run, the length of which is dependent only on the amount of material desired, as new spools can be tied on the creel and additional rubber supplied to feed 28 without stoppage of the mechanism.

According to another feature of my invention, I improve the manner in which the material is handled in case it is desired to apply a rubber coating to the second side of the composite sheet. The manner of treatment thus far described will provide the sheet of cords with a coating of rubber on one side, and will force that coating in between them. For most purposes for which this type of material is used, however, it is desirable to have the cords completely coated on both sides. This can be accomplished either by leading the sheet 44 (Fig. 6) directly to a second calender in such a way that the rubber sheeted out by that calender will be pressed against the then uncovered side of the cords, or the sheet may be rolled up after the original coating operation and passed again through the calender while the cords are tied back as in Fig. 9. It is to the latter manner of handling that this feature of invention particularly relates.

It is desirable, both in order to avoid waste of material and a subsequent trimming operation to make the sheet ready for use, to trim the sheet on the calender so that only a predetermined amount of rubber projects beyond those cords at the edge of the sheet. This is accomplished during the first coating operation by knives 42, and as the cords are definitely positioned under tension in registration with the calender, no trouble is experienced in causing this trim to be accurately made. Care is necessary in the second coating operation, however, as in ordinary methods of handling, the partially coated cord fabric has no definite registration with respect to the calender, and accurate trimming is a matter of considerable difficulty. By the feature of my invention at present under consideration however, proper registration is insured without constant attention on the part of the operator.

The composite sheet 44 resulting from the first coating operation is delivered from roll 43 to a wind-up drum 50 (Fig. 1), preferably power driven as is customary with calender wind-up devices, and mounted so that it will not have any endwise motion. A liner 51 is fed under tension from a spool 52 between the convolutions of the cord fabric sheet on the drum 50 so as to prevent the adjacent turns sticking together. After all the material has been run that is desired, or that can conveniently be mounted on drum 50, the sheet is severed and the cords tied back as previously described with reference to Fig. 9. The calender is now made ready to deliver stock of the gauge and quality desired for the second coat. For this second coating operation, the partially finished sheet 44 is led from drum 50 under the bottom calender roll 27, around a guide roll 53, and between the two bottom calender rolls, where it is pressed against a rubber sheet formed by the upper pair of rolls. The finished sheet, indicated by 54 in Fig. 1, is led around roll 43 and delivered to any suitable wind-up device. The liner 51 is during this operation rerolled upon roll 52, which may be actuated by any suitable wind-up device.

It will be noted that the registration of sheet 44 with the calender is never disturbed during the two calendering operations, and that no resetting of the drum 50 is required. In this manner the sheet 44 will be delivered to the second coating operation in a definite position, to which the knives 42 can be readily accommodated, insuring accuracy in trimming.

Having thus described my invention, I claim:

1. A method of facilitating the handling of a series of cords in the temporary stopping of the operation of producing weftless cord fabric upon a calender, which comprises clamping the series of cords to one calender roll, severing the cords between the clamping point and the finished sheet, securing the free cord ends thus formed at a point out of contact with the calender rolls, and unclamping the cords from the calender roll, whereby the cords are held out of interference with the calender.

2. A method of facilitating the handling of a series of cords in the temporary stopping of the operation of producing weftless cord fabric upon a calender, which comprises clamping the series of cords, severing the cords between the clamping point and the finished sheet, securing the free cord ends thus formed, and unclamping the cords.

THOMAS MIDGLEY.